United States Patent
Meyer et al.

[15] 3,659,682

[45] May 2, 1972

[54] BI-DIRECTIONAL TORQUE LIMITING BRAKE MECHANISM

[72] Inventors: Marvin Meyer, West Caldwell; Salvatore Avena, Newark; Robert L. Leiner, Pompton Lakes, all of N.J.

[73] Assignee: Curtiss-Wright Corporation

[22] Filed: Nov. 13, 1970

[21] Appl. No.: 89,168

[52] U.S. Cl. .............................. 188/134, 188/135, 192/8 R
[51] Int. Cl. ........................................................... B60t 7/12
[58] Field of Search .................. 188/110, 134, 135; 192/7, 8, 192/70.16, 70.17

[56] References Cited

UNITED STATES PATENTS

| | | | |
|---|---|---|---|
| 1,934,790 | 11/1933 | Brownlee | 192/41 |
| 3,329,242 | 7/1967 | Minarick et al. | 188/134 |
| 3,572,481 | 3/1971 | Moritz | 192/12 |

Primary Examiner—Evon C. Blunk
Assistant Examiner—Johnny D. Cherry
Attorney—Arthur Frederick and Victor D. Behn

[57] ABSTRACT

The bi-directional torque limiting brake mechanism comprises two coupling members coaxially supported for relative rotation within a housing and in closed spaced relationship to a braking surface formed on the housing. A coil spring is disposed in the space adjacent the braking surface and in constant drivable connection at its ends with the coupling members. A switching means is connected to an input shaft to be rotated by the latter and to an output shaft to rotate the latter. The switching means is in rotative engagement with each of the coupling members to transmit rotation in one direction to one coupling member and in the opposite direction to the other coupling member so that rotation is transmitted through the spring in a direction tending to uncoil the spring in both directions of rotation of the input shaft. The coil spring is preloaded to a predetermined torque load value so that the coils expand at the predetermined torque value and engage the housing braking surface and thereby cease transmission of rotation from the input shaft to the output shaft.

16 Claims, 6 Drawing Figures

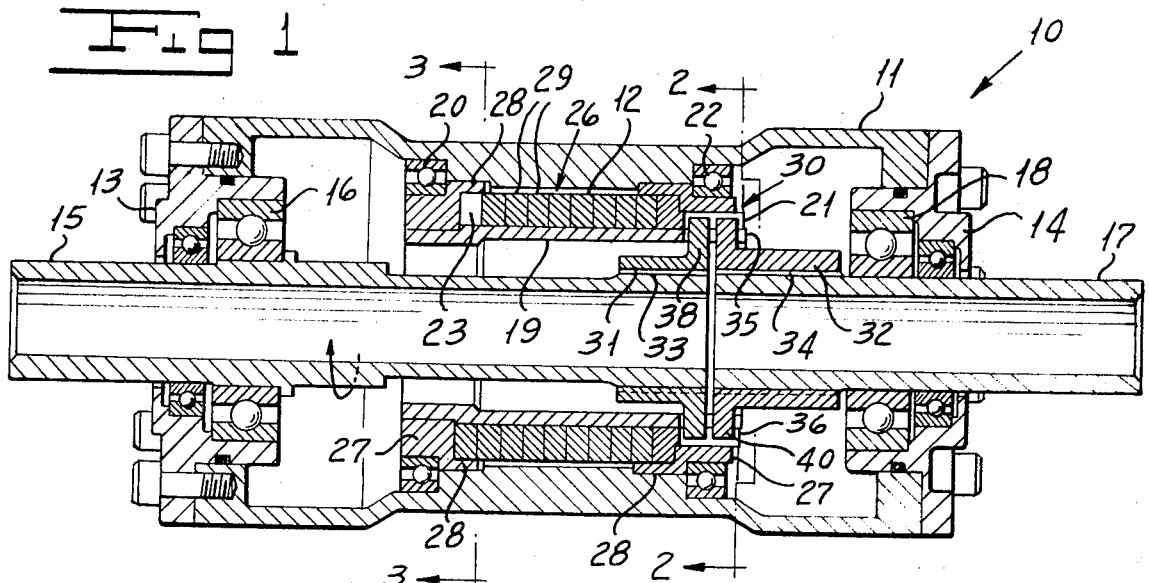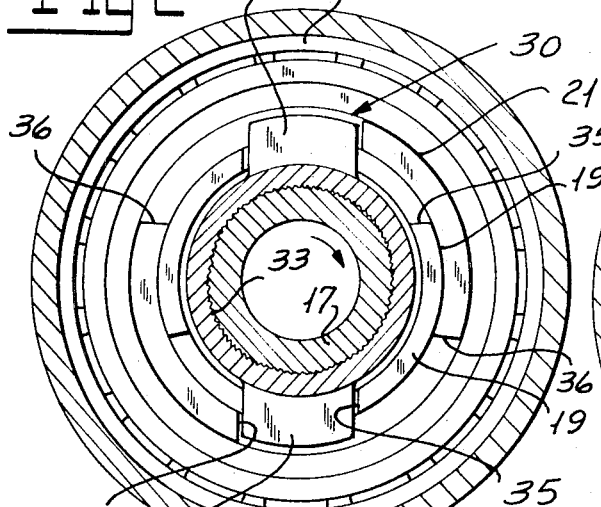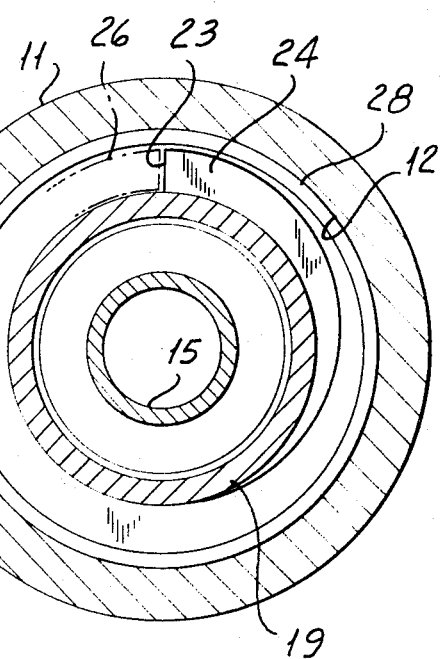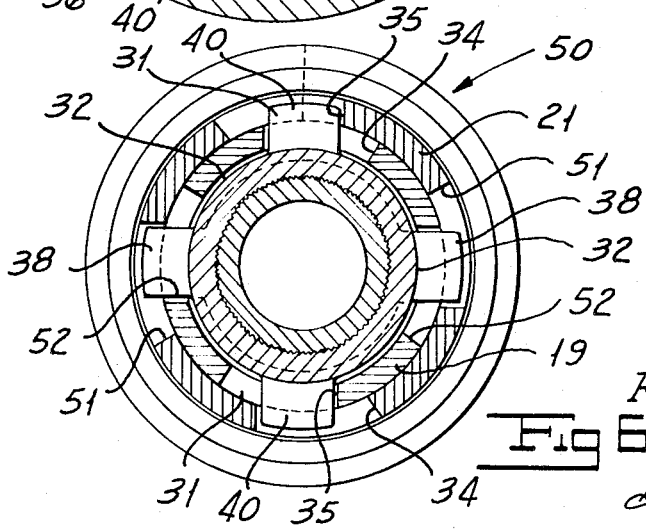
INVENTORS
Marvin Meyer
Robert L. Leiner
Salvatore Avena
Arthur Frederick
ATTORNEY

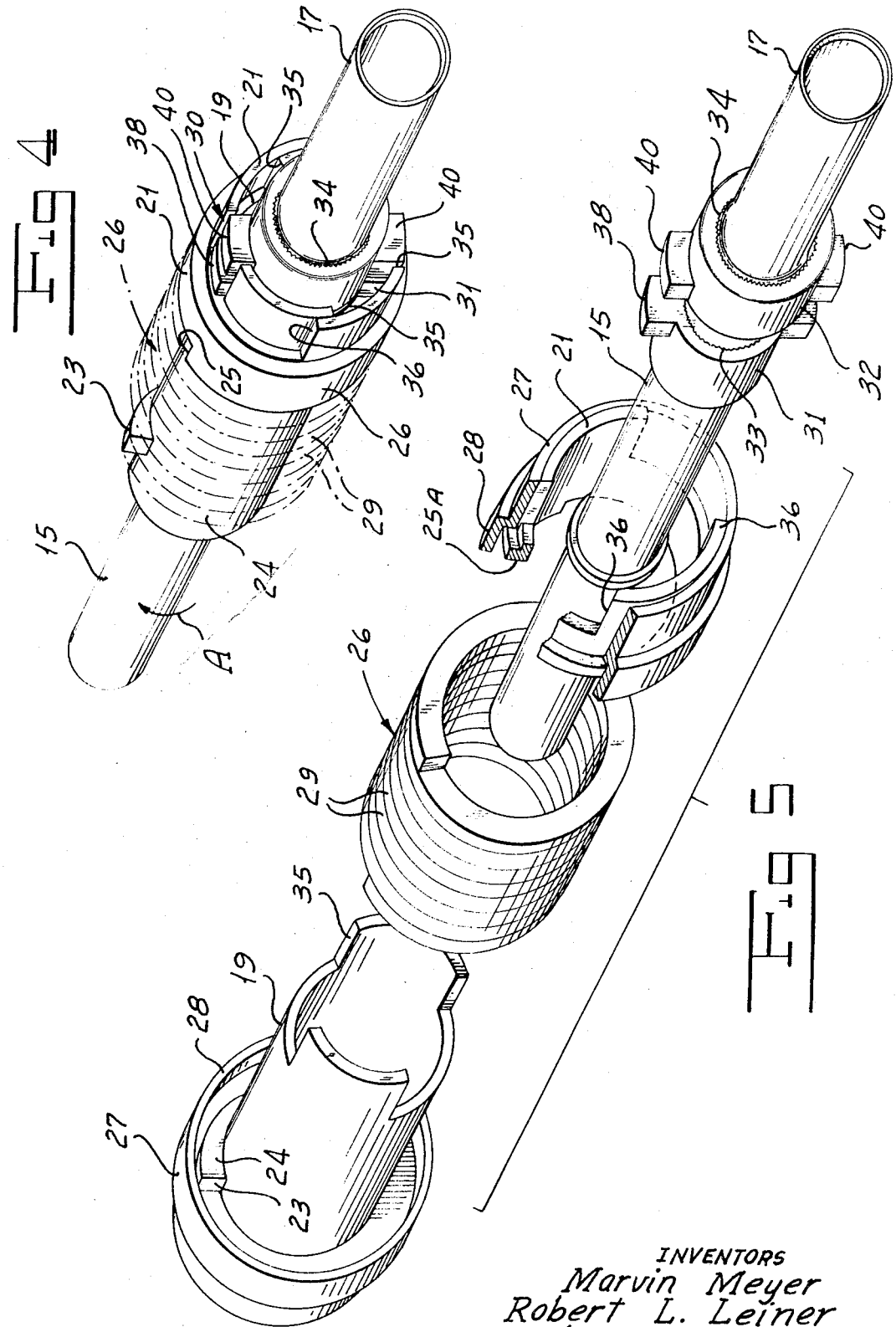

BI-DIRECTIONAL TORQUE LIMITING BRAKE MECHANISM

DISCLOSURE OF THE INVENTION

This invention relates to torque limiting brake mechanisms and, more particularly, to a torque limiting spring brake mechanism of the bi-directional type.

BACKGROUND OF THE INVENTION

Heretofore, torque limiting spring brake mechanisms of the bi-directional type, as exemplified in the U.S. Pat. No. 3,329,242 to Minarick et al., have been relatively complex and expensive devices which were difficult to assembly. One difficulty in assembly of such torque limiting spring brake mechanisms is that the spring element must be loaded (under force) while the assembly is being made. To insure proper seating and the positioning of the components of the assembly, the aforesaid difficulty requires the use of special tools and jigs, and adds a time factor to the total time of fabrication. The complexity of present torque limiting spring brake mechanisms is brought about by the fact that two pairs of abutment elements disposed to alternately engage opposite ends of the spring are necessary to affect bi-directional operativeness of the mechanism.

Accordingly, it is an object of the present invention to provide a bi-directional torque limiting brake mechanism which is relatively simple and inexpensive in construction and can be easily assembled.

It is another object of this invention to provide a bi-directional torque limiting brake mechanism in which assembly of the spring can be achieved without placing the spring under load.

It is a further object of the present invention to provide a bi-directional torque limiting brake mechanism in which only one pair of abutment elements is required for affecting bi-directional operativeness.

A still further object of this invention is to provide a bi-directional torque limiting brake mechanism which, except for the input and output rotation members, can be assembled without loading of the spring (spring in relaxed state).

SUMMARY OF THE INVENTION

Accordingly, the present invention contemplates a bi-directional torque limiting brake mechanism comprising two coaxially arranged coupling members supported for relative rotation in a housing and a torque limiting means disposed in constant drivable connection with the coupling members to rotatively interconnect the coupling members. A switching means is connected to a source of bi-directional rotation and to an output member to be rotated by the former and rotate the latter. The switching means is connected to each of the coupling members so that rotation is transmitted alternately through the torque limiting means via one or the other coupling members depending upon the direction of rotation. The torque limiting means is constructed and arranged to engage the housing and thus cease transmission of rotation from the source of bi-directional rotation to the output member upon a predetermined torque load on the torque limiting means.

In a more specific aspect of this invention the torque limiting means is a coil spring, the opposite ends of which connect with one of the coupling members and which coil spring, upon a predetermined torque load, unwraps or expands to engage a braking surface formed in the housing.

In another more detailed aspect of the invention, the switching means comprises at least two lugs, one of which is rotatively driven by the bi- directional source of rotation and the other connected to rotate the output member. Each of the lugs projects into an opening in each of the coupling members. The lug driven by the bi-directional source of rotation engages the wall of the opening of one coupling member in one direction of rotation to rotate the coupling member in that direction and the wall of the opening of the other coupling member in the opposite direction of rotation to rotate the coupling member in that direction. The other lug engages the wall of the opening of the coupling member not engaged by the lug driven by the source of bi-directional rotation to be rotated by the associated output member depending upon the direction of rotation of the input member.

BRIEF DESCRIPTION OF THE DRAWINGS

The invention will be more fully understood from the following description when considered in connection with the accompanying drawings in which:

FIG. 1 is a longitudinal cross-sectional view of the bi-directional torque limiting brake mechanism according to the present invention;

FIG. 2 is a view in cross-section taken along line 2—2 of FIG. 1;

FIG. 3 is a transverse cross-sectional view taken along line 3—3 of FIG. 1;

FIG. 4 is a view in perspective with parts broken away and omitted for illustrative purposes only;

FIG. 5 is an exploded view in perspective of the major component parts of the mechanism of this invention, with some parts broken away for illustration purposes; and FIG. 6 is a schematic view of modification of the switching means.

DESCRIPTION OF THE PREFERRED EMBODIMENT

Now referring to the drawings and particularly to FIG. 1, the reference number 10 generally designates the bi-directional torque limiting brake mechanism according to this invention which has application in a wide variety of torque transmission systems where, such as wing flap actuation systems for aircraft, interruption of torque transmission upon a temporary overload condition is required and where normal torque transmission is automatically restored upon a relieving of the overload condition.

As best shown in FIG. 1, mechanism 10 comprises a housing 11 which has an internal cylindrical braking surface 12 and end walls 13 and 14. An input means may be, as shown, a tubular drive shaft 15 journalled for rotation in bearings 16 supported in end wall 13. An output means as shown, may be a tubular driven shaft 17 journalled for rotation in bearing 18 disposed in end wall 14. The drive shaft 15 is connected to a source of bi-directional rotation or torque force (not shown), while driven shaft 17 is connected to actuate a device (not shown), such as a wing flap.

A first coupling member 19 which is tubular in shape is disposed to surround the inner end portion of drive shaft 15 and is supported for rotation in housing 11 in spaced relation to braking surface 12 by bearing 20. A second coupling member 21, of tubular shape similar to first coupling member 19, but of shorter length and larger diameter, is supported in housing 11 by bearing 22 in coaxial relation to coupling member 19. As best shown in FIGS. 4 and 5, coupling member 19 has a radially projecting shoulder or abutment 23 which may be formed by an integral flange 24. The outer peripheral surface of flange 24 extends spirally inwardly to merge into the surface of coupling member 19. Similarly, as best seen in FIGS. 4 and 5, coupling member 21 has a shoulder or abutment 25 formed by an inwardly inclined end surface 25A of coupling member 21. The flange 26 of coupling member 21 is in juxtaposed position to and in the same plane as flange 24 of coupling member 19 so that their respective abutments 23 and 25 face in opposite directions to engage the opposite ends of a helically wound spring 26 (shown in phantom lines in FIG. 4). Also forming part of each of the coupling members 19 and 21 is a retainer collar or ring 27 (omitted for clarity in FIG. 4) which is secured in any suitable manner to the associated coupling member. Each of the retainer rings 27 has an annular flange 28 which is dimensioned to overlie the endmost coil of the coils 29 of spring 26 and serves as a bearing surface against which the spring ends can abut and prevent the deformation of the endmost coil toward braking surface 12 when the spring is under a torque load. The retainer rings 27 are preferably made as separate elements from the coupling members only for convenience of fabrication and therefore retainer rings 27 may be made integral with their associated coupling members without departure from the scope and spirit of this invention. Furthermore, retainer rings 27, while desirable, may be omitted without change in the inventive concept.

The spring 26 is preferably fabricated from spring tempered metal stock having a substantially square cross-sectional configuration. The spring 26 functions to transmit torque between coupling members 19 and 21 in one operative condition and, in another operative condition, functions to cease transmission of rotation between the coupling members by engaging braking surface 12 of housing 11. More specifically, the spring is dimensioned so that below a predetermined torque load the outer peripheral surfaces of coils 29 are spaced from braking surface 12 and when the predetermined torque load is reached and coupling members 19 and 21 rotate relative to each other, the coils 29 unwrap or expand to bear against braking surface 12. To provide this function in both directions of rotation of drive shaft 15, a switching means 30 is provided to interconnect drive shaft 15 and driven shaft 17 with coupling members 19 and 21.

The switching means 30 comprises an input connector 31 and an output connector 32 which are spline connected, respectively, at 33 and 34 to drive shaft 15 and driven shaft 17. In addition, switching means 30 includes a first set of diametral openings or slots 35 extending inwardly from the end of coupling member 19 and a second set of diametral openings or slots 36 extending inwardly from the end of coupling member 21. The input connector 31 has diametral arms or lugs 38 while output connector 32 has similar diametral arms or lugs 40. The diametral slots 35 and 36 are positioned to communicate with each other and are dimensioned to receive lugs 38 and 40. The slots 35 and 36 in relation to the size of lugs 38 and 40 are oversized so that a small amount of relative rotation between coupling members 19 and 21 is permitted and, thereby, effect expansion of coils 29 of spring 26 into engagement against brake surface 12.

ASSEMBLY

In the assembly of the mechanism 10 herein described, the coupling members 19 and 21 and spring 26 can be disposed in housing 11 as a completed subassembly prior to connecting drive shaft 15 and driven shaft 17. In this subassembly, spring 26 is positioned in proper relation to coupling members 19 and 21 without preloading of the spring. To complete the assembly and impose the desired predetermined torque load on spring 26, coupling members 19 and 21 are rotated relative to each other to bring abutments 23 and 25 into engagement with the opposite ends of spring 26 and thereafter wind the spring to the predetermined torque load. When the spring is at the predetermined torque load, slots 35 and 36 are in register. With the slots 35 and 36 in registry, input connector 31 and output connector 32 are slid on drive shaft 15 and driven shaft 17, respectively, to bring the splines into meshing relationship at 33 and 34 and lugs 38 and 40 into slots 35 and 36. Thereafter, end wall 14 can be bolted to housing 11. In an alternative assembly procedure, input and output connectors 31 and 32 can form part of a subassembly which is completed merely by connecting drive shaft 15 and driven shaft 17 to input and output connectors 31 and 32. Since spring 26 and coupling members 19 and 21 can be assembled without preloading of spring 26, the proper seating and relationship of components is possible quickly and easily. In addition, preloading of the assembled spring 26 can be achieved without special tools or jigs, and merely by relative rotation of coupling members 19 and 21.

FUNCTION

In operation of mechanism 10, assuming the source of bi-directional rotation is rotating drive shaft 15 in clockwise direction as viewed in FIG. 4 and as indicated by the arrow A, such rotation causes input connector 31 to rotate in a clockwise direction. This rotation or torque force is transmitted from diametral lugs 38 of input connector 31 to coupling member 21 via abutment of lugs 38 on the walls of diametral slots 36 of coupling member 21. The clockwise torque transmitted to coupling member 21 imposes a torque force on spring 26 by way of abutment 25. The torque force is transmitted through coils 29 of spring 26 to coupling member 19, via engagement of the end of spring 26 with abutment 23. The clockwise rotation of coupling member 19 is in turn transmitted, via the walls of diametral slots 35, to lugs 40 of output connector 32. From output connector 32, rotation is transmitted to driven shaft 17, via spline connection 34 and, thence, to the device to be actuated (not shown).

Assuming a change in the direction of rotation of drive shaft 15 to a counterclockwise direction, as viewed in FIGS. 2 and 4, such rotation is transmitted by input connector 31 to coupling member 19 through the engagement of diametral lugs 38 against the walls of slots 35. The counterclockwise rotation of coupling member 19 transmits rotation to spring 26, via abutment 23. From spring 26 rotation is conveyed, through the end of spring 26 and abutment 25, to coupling member 21 and, thence, to output connector 32, via engagement of the walls of the slots 36 against diametral lugs 40 of output connector 32. The counterclockwise rotation of output connector 32 causes counterclockwise rotation of driven shaft 17 and the actuation of a device (not shown).

It can be readily seen that switching means 30 shifts rotative drive from one end of spring 26, depending upon rotation of the input means or drive shaft 15, so that regardless of the direction of rotation the torque force on spring 26 is always in a direction tending to unwrap or unwind the coils 29 of spring 26. Thus, when the predetermined preload torque value of spring 26 is reached and relative rotative movement of coupling members 19 and 21 occurs, the coils 29 are caused to expand or unwrap to abut braking surface 12 of housing 11. Of course when coils 29 of spring 26 engage the fixed braking surface 12, rotation of coupling members 19 and 21 and, hence, driven shaft 17 is stopped. When such overload torque force is relieved, rotation in the direction imposed by drive shaft 15 is automatically resumed.

ALTERNATIVE EMBODIMENT

In FIG. 6 is shown a cross-sectional view similar to FIG. 2 showing an alternative switching means 30, designated by the reference number 50, which comprises a plurality of sets of diametral slots instead of one set of diametral slots shown in switching means 30, and wherein the arms or lugs of the input and output connectors are receivable in angularly offset diametral slots. Like parts of switching means 50 corresponding to like parts of switching means 30 are designated by the same reference number.

As shown in FIG. 6, switching means 50 includes, in addition to diametral slots 34 and 35 in coupling members 21 and 19, respectively, a second set of diametral slots 51 and 52 in coupling members 21 and 19, respectively. In the assembly of the mechanism, input connector 31 and output connector 32 are positioned so that the lugs 38 of input connector 31 extend into slots 51 and 52 while the lugs 40 extend into slots 34 and 35. The function of switching means 50 to affect transmission of rotation from one coupling member to the other through the spring in a direction tending to uncoil spring 26 in both directions of rotation of drive shaft 15 is the same as switching means 30. The feature of a plurality of sets of diametral slots in coupling members 19 and 21, whether the lugs of input and output connectors are positioned in the same or different sets of slots, permits a more accurate torque preloading of spring 26. Obviously, the greater number of sets of diametral slots the greater the degree of accuracy in the preloading of the spring to a desired torque value.

It is believed now readily apparent that the present invention provides a bi-directional torque limiting brake mechanism which is of simple, relatively inexpensive construction and is capable of easy assembly. It is a mechanism wherein there is no lost motion and, hence, no delay in transmission of torque in either direction of rotation or when a change in direction of rotation occurs.

Although two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A bi-directional torque limiting brake mechanism comprising:
   a. housing;
   b. two coaxially disposed coupling members supported for rotation in said housing;
   c. a torque limiting means disposed in direct constant drivable connection with the coupling members to rotatively interconnect the coupling members;
   d. an input means connected to a source of bi-directional rotation;
   e. an output means; and
   f. switching means connected to said input means to be rotated by the latter and to said output means to rotate the latter;
   g. the switching means being connected at one end of each of the coupling members to transmit rotation in one direction to one coupling member and rotation in the opposite direction to the other coupling member so that the output means is rotatively driven in one direction or the other depending upon the direction of rotation of the input means;
   h. said torque limiting means being constructed and arranged to engage the housing upon a predetermined torque load and thereby affect secession of transmission of rotation from the input means to the output means.

2. The mechanism of claim 1 wherein said torque limiting means is a coil spring, the ends of which are in constant drivable connection with the coupling members.

3. The mechanism of claim 1 wherein the switching means comprises at least two lugs one of which is drivably connected to the input means and the other lug connected to rotate said output means, the lug connected to the input means being disposed to engage the coupling members so as to transmit rotation from the input means to one coupling member in one direction and the other coupling member in the opposite direction, the lug connected to the output means being disposed to engage the coupling member not in engagement with the other lug.

4. A bi-directional torque limiting brake mechanism comprising, in combination, with a housing having a cylindrical braking surface:
   a. two coupling members coaxially supported for rotation independent of each other within the housing and in spaced relation to said braking surface;
   b. a coil spring disposed in the space between the coupling members and the braking surface and in constant drivable connection at its end portions with one coupling member at one end and the other coupling member at the opposite end;
   c. an input means connected to a source of bi-directional rotation;
   d. an output means, and
   e. switching means connected to said input means to be rotated by the latter and to said output means to rotate the latter;
   f. the switching means being in engagement with each of the coupling members to transmit rotation in one direction to one coupling member and in the opposite direction to the other coupling member so that rotation is transmitted through the coil spring in a direction tending to expand the spring in both directions of rotation of the input means;
   g. said coil spring being preloaded to a predetermined torque load value so that the coils expand at said predetermined torque value to engage the braking surface on said housing and thereby affect secession of rotation from the input means to the output means.

5. The mechanism of claim 4 wherein said two coaxially disposed coupling members are disposed one within the other.

6. The mechanism of claim 4 wherein the input means and output means is, respectively, a drive shaft and a driven shaft.

7. The mechanism of claim 4 wherein switching means is in engagement with each of said coupling members at the adjacent end portions of the coupling members.

8. The mechanism of claim 4 wherein each of said coupling members has an abutment and wherein the abutment of one coupling member engages one end of the coil spring and the abutment of the other coupling member engages the opposite end of the coil spring.

9. The mechanism of claim 4 wherein the switching means comprises at least two engaging elements, one of which is in drivable engagement with the input means and the other in engagement with the output means, the lug engagement in the input means being disposed so as to transmit rotation from the input means to one coupling member in one direction and the other coupling member in the opposite direction, the element engaging the output means being disposed in engagement with the coupling member not engaged by the element driven by the input means to thereby be rotated in a direction depending upon the direction of rotation of the input means.

10. The mechanism of claim 9 wherein said engaging elements are lugs and wherein each coupling member has an abutment means which the lugs contact.

11. The mechanism of claim 4 wherein the coupling members are tubular and each has at least one slot in one end thereof and wherein the switching means comprises at least two lugs one of which is in drivable connection with the input means and the other lug in drivable connection with the output means, the first mentioned lug being in drivable engagement with the wall of the slot to rotate one coupling member in one direction and the wall of the slot of the other coupling member to rotate the other coupling member in the opposite direction, the second mentioned lug being in drivable engagement with the wall of the slot of the coupling member not engaged by the first mentioned lug to be rotated by the latter in a direction dependent upon the direction of rotation of the input means.

12. The mechanism of claim 4 wherein the coupling members are tubular and each has at least a pair of diametral notches in one end thereof and wherein the switching means comprises an input connector and an output connector each of which have diametrally disposed radially extending arms, the input connector being connected to the input means to be rotated by the latter and the output connector being connected to the output means to rotate the latter, the arms of said input connector extending to abut the walls of the diametral notches of one coupling member in one direction of rotation and the walls of the diametral notches of the other coupling member in the opposite direction of rotation, the arms of said output connector extending to abut the walls of the diametral notches of the coupling member not driven by the arms of the input connector so as to be rotated and, in turn, rotate said output means in a direction dependent upon the direction of rotation of the input means.

13. The mechanism of claim 12 wherein said diametral slots in each of the coupling members are angularly offset and in communication so as to receive therein aligned arms of the input and output connectors.

14. The mechanism of claim 4 wherein said coupling members and spring are constructed and arranged to be assembled without preload of the coil spring and without said switching means, said input means and said output means.

15. The mechanism of claim 4 wherein said coupling members are tubular and rotatable relative to each other to impose a torque load on the coil spring to said predetermined torque load.

16. The mechanism of claim 4 wherein the coupling members are disposed in close spaced annular relation to said braking surface and said coil spring is disposed in said annular space, and wherein said coils of the coil spring expand to engage said braking surface upon said predetermined torque load thereon.

* * * * *